United States Patent [19]

Stockman

[11] 4,352,145
[45] Sep. 28, 1982

[54] MULTIPLE ELEMENT CYLINDRICAL METALLIZED FILM CAPACITORS AND METHOD OF MAKING THE SAME

[75] Inventor: Robert M. Stockman, Brookfield Center, Conn.

[73] Assignee: American Radionic Co., Inc., Danbury, Conn.

[21] Appl. No.: 204,164

[22] Filed: Nov. 5, 1980

[51] Int. Cl.³ .............................................. H01G 4/38
[52] U.S. Cl. .................. 361/329; 29/25.42; 361/330
[58] Field of Search ............... 29/25.42; 361/328, 329, 361/330, 308, 304

[56] References Cited

U.S. PATENT DOCUMENTS

| | | | |
|---|---|---|---|
| 3,251,115 | 5/1966 | Pfeiffer | 361/308 X |
| 3,921,041 | 11/1975 | Stockman | 361/330 |
| 4,048,593 | 9/1977 | Zillman | 361/330 |
| 4,170,812 | 10/1979 | Rayno | 361/330 X |

FOREIGN PATENT DOCUMENTS

| | | | |
|---|---|---|---|
| 7953 | 3/1956 | Fed. Rep. of Germany | 361/330 |
| 197097 | 7/1938 | Switzerland | 361/330 |
| 569700 | 6/1945 | United Kingdom | 361/330 |

Primary Examiner—Elliot A. Goldberg
Attorney, Agent, or Firm—Parmelee, Bollinger & Bramblett

[57] ABSTRACT

A multiple element, cylindrical, metallized film capacitor and method of making the same are provided which facilitate the winding and making of electrical connections to a small value element of the multiple element capacitor. First and second dielectric films are metallized on one side thereof and are wound in cylindrical form with the non-metallized side of one film being in contact with the metallized side of the other. Selective portions of one or both of the metallized sides are removed in order to provide a multiple element device. In one embodiment, a metal strip having a metal tab extending therefrom is wound in an area where one of the metallized sides has been removed and an insulated strip is wound to surround the metal strip which forms one plate of a small capacitor. In another embodiment only a portion of the width of a metallized side of a film is removed providing more turns for the small capacitor to which an electrical connection can be made. In another embodiment, the winding is made on a metal core which forms a plate of the small capacitor. In another embodiment the small capacitor is wound on an insulated core, the end of which is sprayed along with the turns of the small capacitor in order to facilitate making an electrical connection thereto.

Advantageously, according to the present invention an extremely small size capacitor on the order of 0.05 microfarad in combination with a 3.95 microfarad capacitor may be readily and rapidly wound and connections made thereto in a manner which is more efficient, faster, and more economical than previous methods.

8 Claims, 7 Drawing Figures

MULTIPLE ELEMENT CYLINDRICAL METALLIZED FILM CAPACITORS AND METHOD OF MAKING THE SAME

BACKGROUND OF THE INVENTION

This invention relates to multiple element, cylindrical, metallized film wound capacitors, and more particularly to such capacitors and the method of making the same which utilize at least one very small integrally wound element to which electrical connections must be made.

In U.S. Pat. No. 3,921,041 entitled "Dual Capacitor" by the inventor of the present invention, there is disclosed a method for winding a dual capacitor utilizing two metallized films. After winding has progressed through a predetermined number of turns for one of the capacitors, the metallized layer of one of the films is removed over a selected area and an insulating sheet or strip having a length sufficient to encircle the capacitor at least once is inserted between the layers to extend beyond one end of the capacitor and to separate the portions of the metallized film which have been removed. The winding is then completed and each end of the wound section is metal plated. Leads are secured to the plated ends from which the insulating sheet or strip extends, one lead being placed within, and the other without, the insulating barrier. This has been proved to be a very effective method of winding a multiple element capacitor. There is a problem, however, when the inner capacitor section is extremely small, for example, 0.15 to 0.25 inch diameter for making capacitors of the size of approximately 0.05 microfarad. Because of the small number of turns, it is difficult to make lead connections by metal flame spraying the end of the section of the small capacitor and soldering an electrical lead thereto inside a barrier. Furthermore, great care must be provided in selectively removing the metallized layer in order to provide the proper plate size in order to obtain a 0.05 microfarad capacitor.

SUMMARY

Accordingly, it is an object of the present invention to provide a new and improved method of making a multiple element, cylindrical metallized film capacitor which is simple, economical and efficient.

A further object of this invention is to provide a new and improved multiple element, cylindrical, metallized film capacitor wherein it is simple to make external connections, even for low value capacitor sections thereof.

Still another object of this invention is to provide a new and improved multiple element, cylindrical, metallized film capacitor and a method of making the same which lends itself to efficient winding techniques which do not slow the winding process in order to accommodate making electrical connections to extremely small elements of multiple element capacitors.

In carrying out this invention in one illustrative embodiment thereof, the method of making a multiple element, cylindrical, metallized film capacitor from first and second dielectric films which are selectively metallized on one side thereof is provided. The films are wound in cylindrical form with the non-metallized side of one film being in contact with the metallized side of the other film. A section of the metal layer of one of the films is removed before or as the capacitor is being wound and a metal strip is inserted between the first and second films having a predetermined size for forming one plate of a small capacitor of the multiple element capacitor. An insulating strip is then inserted for isolating the plate so formed from the other plates of the multiple element capacitor and the winding is completed.

In one embodiment, a metal tab extends from the metal strip in order to conveniently make a connection to the small capacitor so wound. In another embodiment, the dielectric films are wound on a metal core which forms one plate of a small capacitor of the multiple element capacitor. The winding may also be made on an insulated core, the end of which is sprayed along with the winding constituting one plate of the small capacitor in order to provide more room for making an electrical connection to the small plate. In a further embodiment, only a portion of the width of one of the metallized sides is removed, providing more end turns to which an electrical connection can be made.

Advantageously, an extremely small value, thin film capacitor can be readily and rapidly wound along with other capacitor values and electrical connections made thereto in a manner which is more efficient, faster, and more economical than previous winding or other techniques.

BRIEF DESCRIPTION OF THE DRAWINGS

The invention, together with further aspects, advantages, and objects thereof will be more fully understood from the following description taken in conjunction with the accompanying drawings in which like elements bear the same reference characters.

DESCRIPTION OF THE PREFERRED EMBODIMENTS

In the following description the term "multiple element" is used to mean more than one capacitor or plates of capacitors, which are wound in the same winding progress and are contained in a single unit. The single unit may be referred to as a capacitor which in reality comprises more than one element or capacitor.

Figure 1:
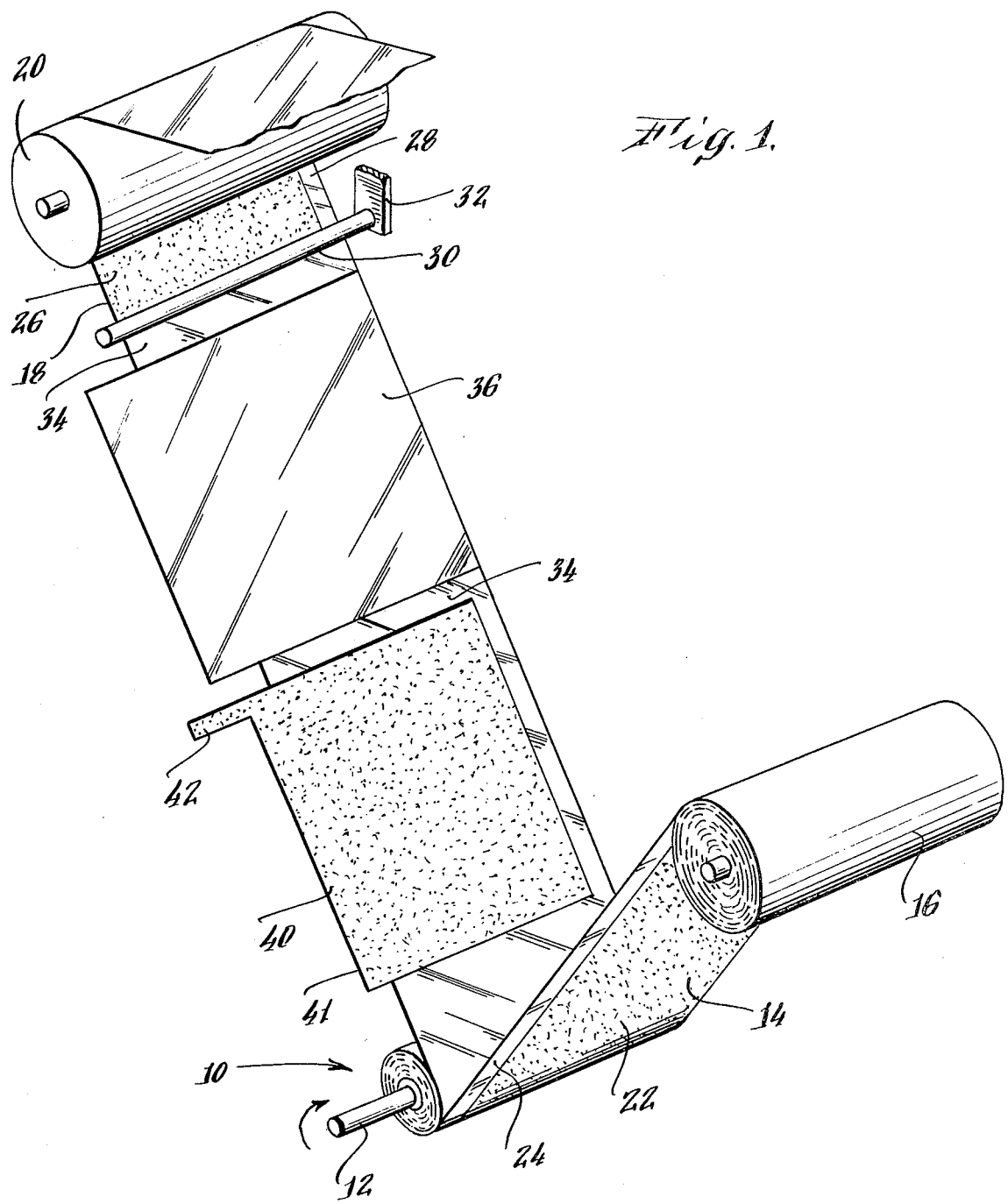
FIG. 1 is a perspective view illustrating the winding of the multiple element, cylindrical, metallized film capacitors in accordance with the present invention.

Referring now to FIG. 1, a multiple element, cylindrical capacitor 10 is shown being wound on a rotating spindle 12 of a conventional winding machine, for example of the type illustrated in the aforesaid U.S. Pat. No. 3,921,041.

A first metallized film 14 is fed from a first supply roll 16 and a second metallized dielectric film 18 is passed from a second supply roll (not shown) over a cylindrical conductive electrode 20. The first film 14 has a thin metallic layer 22 which extends to the right edge of the film but terminates short of the left edge leaving a dielectric non-conductive strip 24 therealong. Similarly, the film 18 carries a thin metallic layer 26 thereon on the front surface as viewed below the electrode 20 in FIG. 1 which extends from the left edge of the film 18 and terminates short of the right edge to form a dielectric strip 28 along the right edge thereof. The extension of the metal to the end permits the spraying and the connection of electrical leads to the layers which form the plates of the capacitor. Accordingly, electrical leads would normally be connected to the right edge of the first metallized film 14 while being made to the left edge of the second metallized film 18.

A second electrode 30 is mounted on a movable arm 32 in such a manner that it may be selectively advanced against or withdrawn from the metallized layer 26 on the film 18. An electrical power source (not shown) will normally be connected between the electrodes 20 and 30 such that when the electrode 30 is moved against the metallized layer 26 the resulting arcing vaporizes the metallic layer 26 and removes it, leaving the film 18 with a non-metallized region 34 where the metal 26 has been removed. The structure to this point and the winding process are conventional and, of course, the metal is removed in order to form or separate the plates of the capacitor to provide a multiple element device. In like manner, portions of the metallic layer 22 could be removed to provide a multiple element portion of the capacitor on the film 14. Accordingly, either of films 14 and 18 may carry a single plate of a multiple element capacitor while the other film forms two or more plates thereon, or each film may carry multiple plates of a multiple element capacitor.

One of the problems encountered in winding multiple element, thin film capacitors of the type described involves making a satisfactory electrical connection to the plate formed on a very small diameter section which is separated from a much larger diameter section. The larger section can easily be coated and an electrical connection applied to the end thereof. With respect to the smaller wound section, it is very difficult to make an exterior connection to a very small number of turns. In the aforesaid U.S. Pat. No. 3,921,041 an insulating strip or insert is provided which extends out the end of the winding and acts as a barrier. Coatings are applied to the end of the capacitor with the barrier preventing shorting between the separated elements and then electrical connections are made inside and outside the barrier. If the separated element is extremely small, it may be quite difficult to make a suitable connection on the inside of the barrier.

In order to alleviate this problem the present invention, as before, first removes the metallic layer from the metallized film 18 to provide an intermediate dielectric region 34 in the capacitor 10. A capacitor plate is inserted and wound in the form of a metal sheet or foil insert 40 having a metal tab 42 extending from the left edge or end of the capacitor 10 being wound. The tab 42 may be integral with the foil insert 40 or may be suitably secured thereto by crimping, welding, soldering, etc. The tab 42 is the portion to which an external electrical connection is made to the capacitor plate formed by the metal insert 40. An insulating strip or insert 36 is fed in the winding process after the metal strip 40 in order to isolate the metal insert 40 from the other capacitor elements which are to be wound. The insulating strip is long enough to completely surround metal insert 40 at least once and is wide enough to extend beyond one end of the capacitor 10 to form an insulating barrier which isolates the plates on different sides of the barrier so that they are not shorted when metallized. If tabs 42 are not used, the electrical connections can be conveniently made to the protruding edge 41 of the plate 40 inside the barrier 36.

The metal insert 40 is inserted over the intermediate region 34 from which the metallized layer 26 of the film 18 has been removed. Accordingly, the metal sheet or foil insert 40 alone forms and acts as a plate for a small capacitor element. The capacitance of that element will depend on the size of the metal insert 40. If the metal layer 22 of the first metallized film 14 is not removed, then there would be continuity between the capacitor plate formed by the metal sheet 40 and the next capacitor element being wound on the spindle 12.

Advantageously, in accordance with this method, the capacitance of a small capacitor can be conveniently controlled by closely trimming the metal insert 40 and not requiring such precise control on the metal removal step, for example, which would be the case if the small capacitor was formed by using a separated portion of the layer 26.

Not only can tolerances be maintained by controlling the size of the metal sheet or insert 40, but, no matter how small the plate formed by the insert 40, the tab 42 facilitates making an electrical connection thereto. Also, if desired, the tab can be welded directly to the can housing the capacitor. Of course, the tab 42 may extend out of either end of the capacitor. As previously stated, if the tab 42 is not employed, electrical connection may be made to the edge 41 of metal insert 40 inside the insulating barrier.

Although, as illustrated in FIG. 1, the electrodes 20 and 30 are employed for the removal of metal layer 26, a supply roll of metallized film 16 may be provided which is preprogrammed and has the desired areas already removed. Also, the metal layer 22 of the film 14 may be selectively removed before or during the winding process for winding different multiple capacitor combinations.

Figure 2:
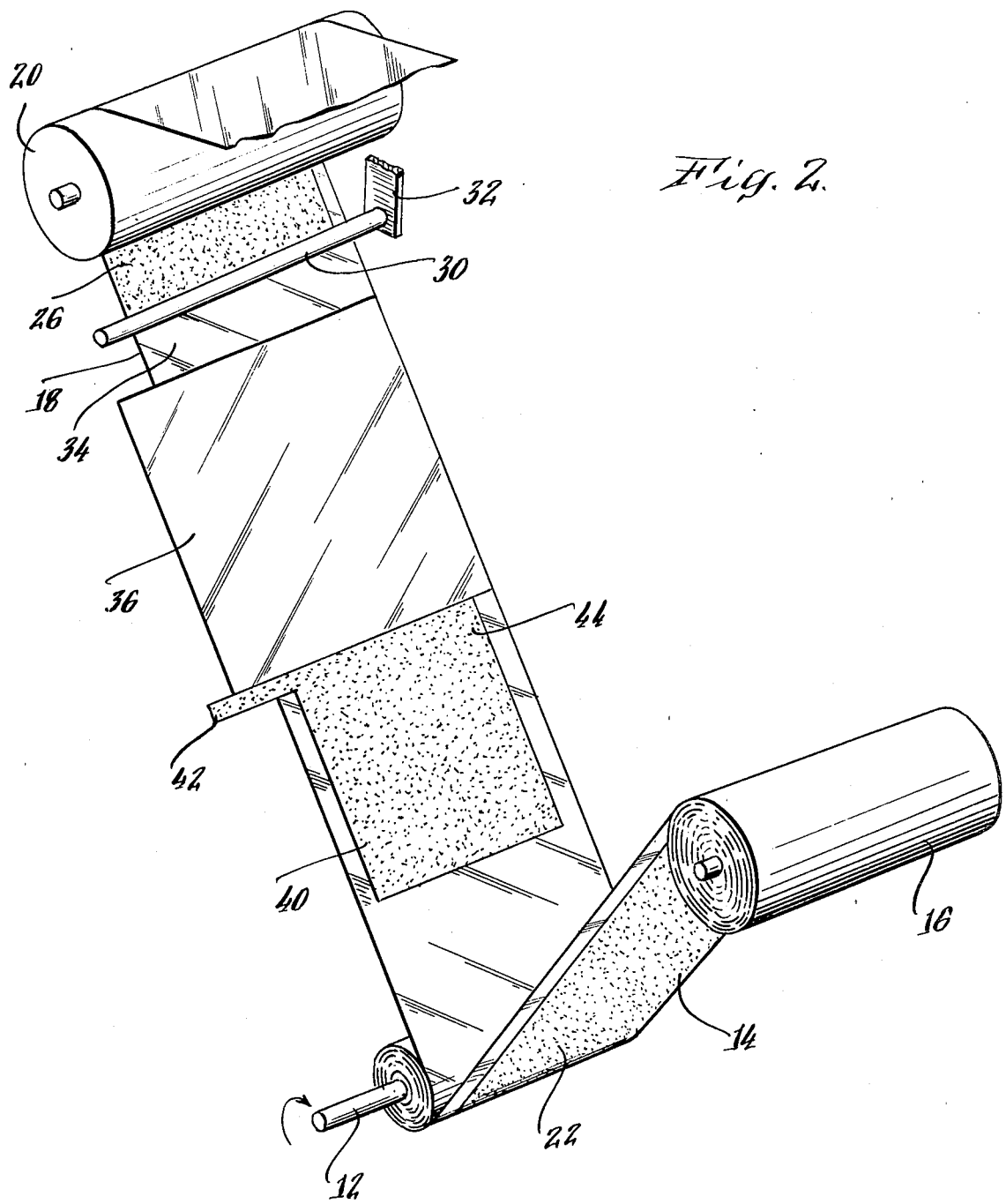
FIG. 2 is a perspective view illustrating the step of feeding connected metallic and insulating strips in the winding process shown in FIG. 1.

Another way of winding the multiple element capacitor of the type shown in FIG. 1 is illustrated in FIG. 2. In this embodiment, the insulating sheet 36 and the metal sheet 40 form a single piece 44. Accordingly, in the winding process only one piece is required to be inserted which simplifies the winding operation. Alternately, a continuous supply roll of alternating interconnected insulating and metal sheets may be fed in the winding process, and the supply roll may be cut to feed a single insert 44 as shown in FIG. 2. If the tabs 42 are not used, the metal insert 46 would extend beyond the left edge of film 18 so that an electrical connection may be made thereto.

Another alternative would reside in providing both a continuous insulating layer 36 and a continuous metal layer 40 having tabs 42 positioned therealong which are both fed simultaneously in the winding process and are selectively cut so that an insulating sheet surrounds each metal insert after winding. Another alternative would be to preload the metallic inserts on a continuous insulating roll and to selectively cut the insulating roll as required during winding to form one plate of a small capacitor.

Figure 3:
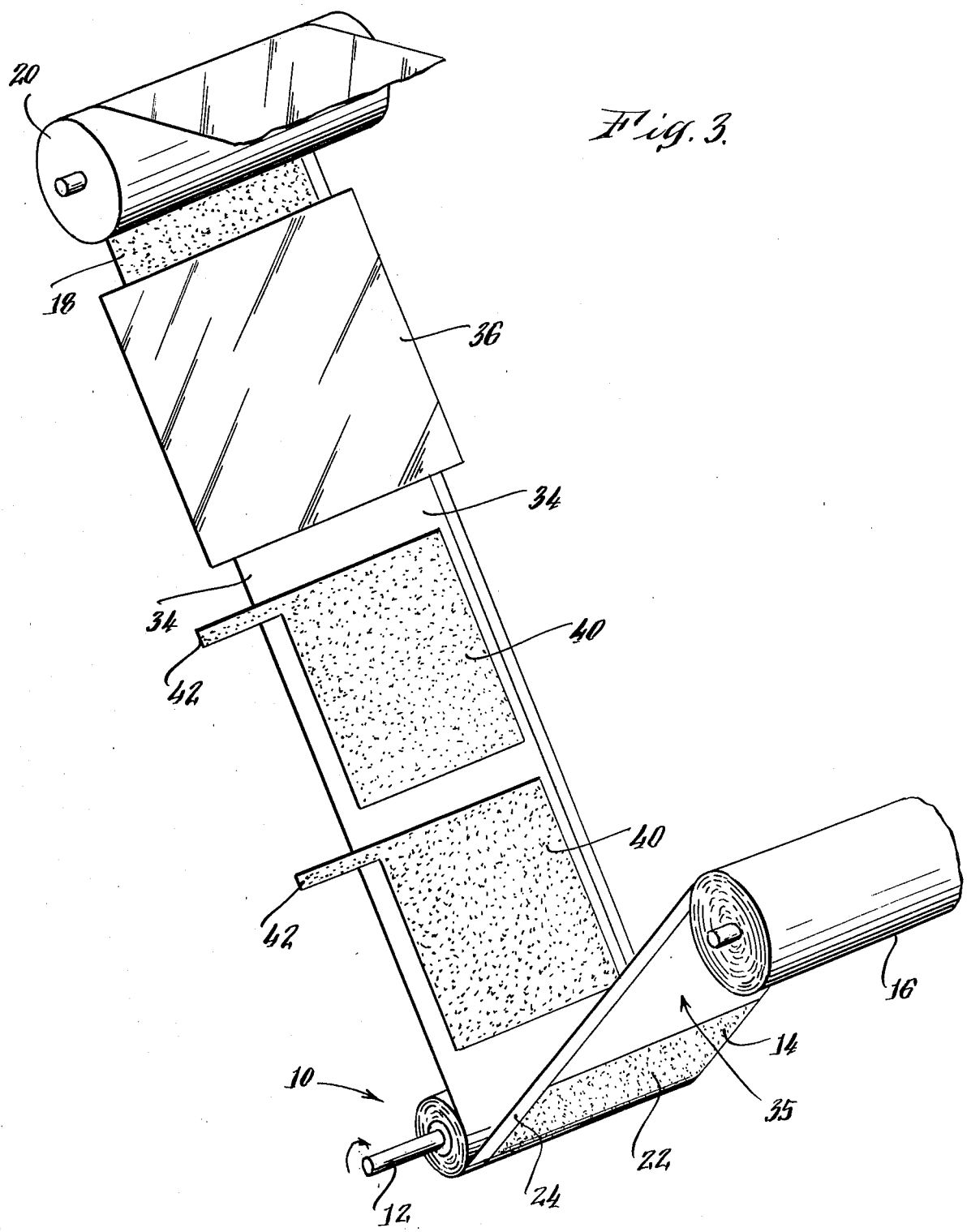
FIG. 3 illustrates a perspective view of an alternative step of feeding a plurality of metal inserts and the insulating strip in the winding process to enable forming a series connected small capacitor.

FIG. 3 illustrates an embodiment similar to FIG. 1 except that two separated metal inserts 40 are fed consecutively followed by the insulating sheet 36 between the films 14 and 18. A demetallized region 35 is also provided on the metallized dielectric film 14 which overlaps, in winding, the plastic barrier formed by the insulating strip 35. The purpose of this embodiment is to provide two 0.1 microfarad capacitors which may be externally connected in series to form a 0.05 microfarad capacitor which is separated from a larger value capacitor formed by the remainder of the metallized dielectric films 14 and 18. By utilizing two larger plates formed by the foils 40 of larger size, the voltage is divided,, thereby reducing corona discharge between the plates. In this particular embodiment the tabs 42 are required in order to make electrical connections to each of the plates formed by the foil inserts 40.

Figure 4:
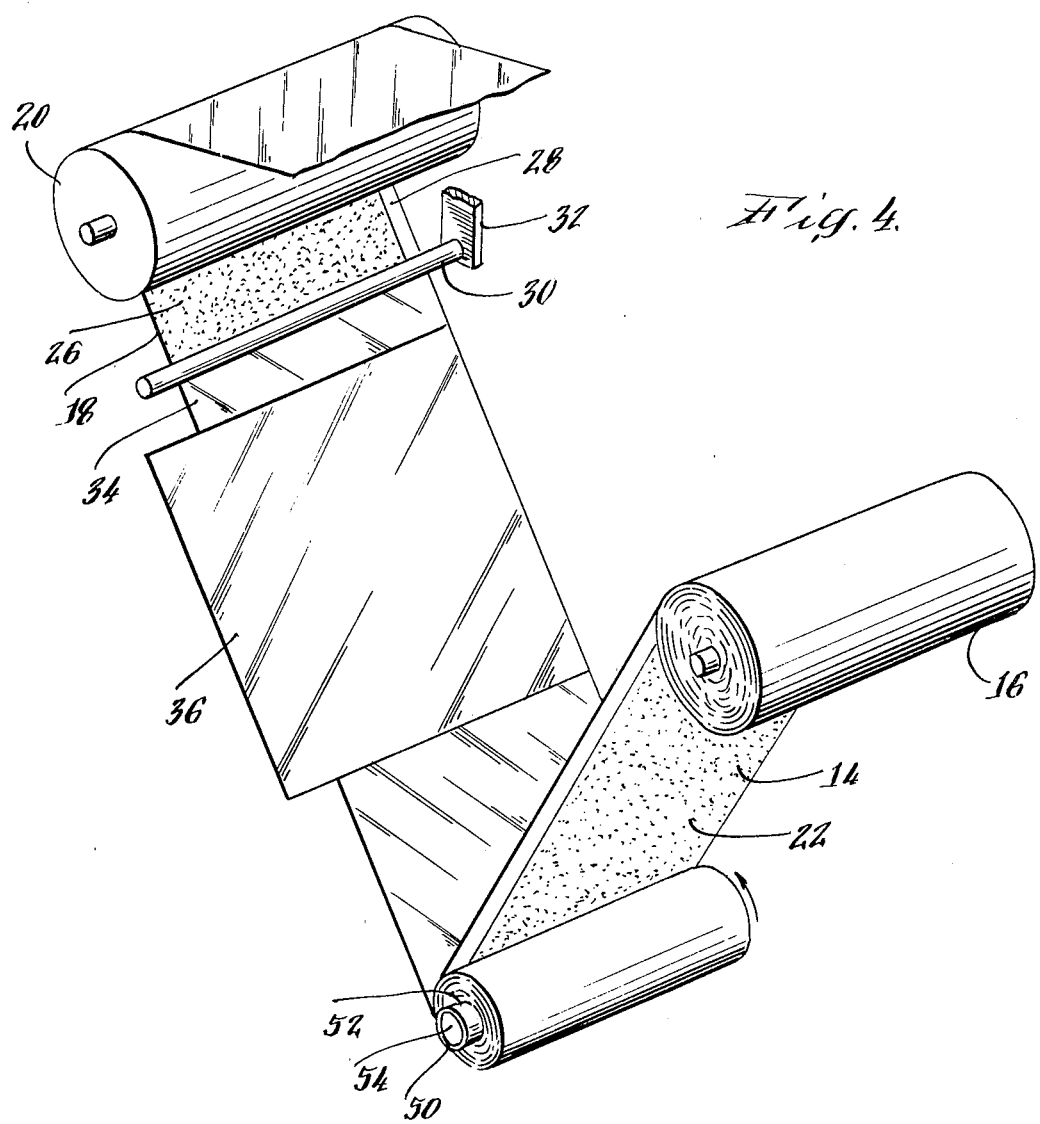
FIG. 4 is a perspective view of another embodiment of the multiple element capacitor that has been wound on a metal core which forms one electrode of a small capacitor.
Figure 5:
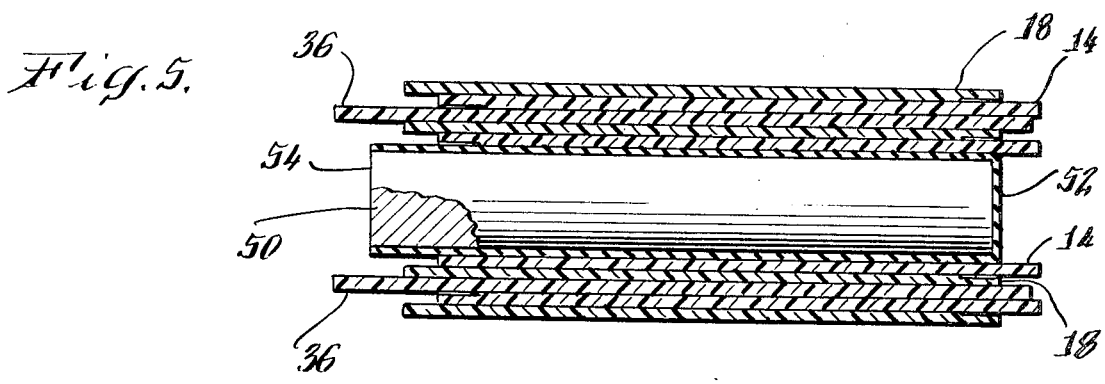
FIG. 5 is a cross-sectional view of a portion of the multiple element capacitor wound as illustrated in FIG. 4.
Figure 6:
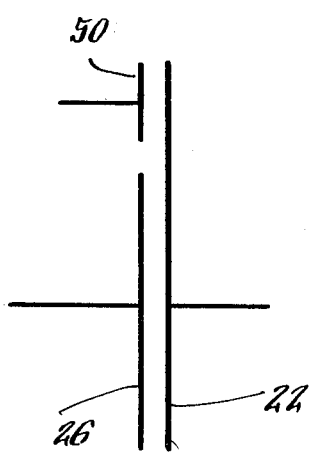
FIG. 6 is an electrical schematic diagram of the capacitor of FIGS. 4 and 5.

In FIG. 4 metallized dielectric films 14 and 18 are wound on a metallic core 50 with the initial portion of the metallized dielectric film 18 demetallized along the region 34 at which point an insulating barrier 36 is inserted therein. In this embodiment the metal core 50 forms the plate of a small capacitor to which an electrical connection can be made with ease. In FIG. 5 it will be seen that the core 50 is surrounded by an insulated coating or layer 52 with the metal exposed along the left edge 54 thereof. The metallized dielectric film 14 surrounds the metal core 50 while the demetallized film 18 surrounds the metallized dielectric film 14. Immediately following is the insulating barrier formed by the insulating layer 36. As will be seen in FIG. 6, the core 50 forms one plate of a small capacitor with the other being formed by the metallized film 14. The larger capacitor is then formed by the metallized layers 22 and 26 of the metallized dielectric films 14 and 18, respectively. The core 50 is surrounded by insulation except on one edge 54 in order to prevent at the right edge, for example, shorting the core with the metallized layer 22 when it is end sprayed in order to make the electrical connection thereto. Although the core is shown performed with an insulation coating 52 thereon, it may be simply wrapped with demetallized zones of the film or with a separate plastic insert which extends beyond the ends thereof in order to separate the ends of the core from the edges of the capacitor to which other electrical connections are made.

Figure 7:
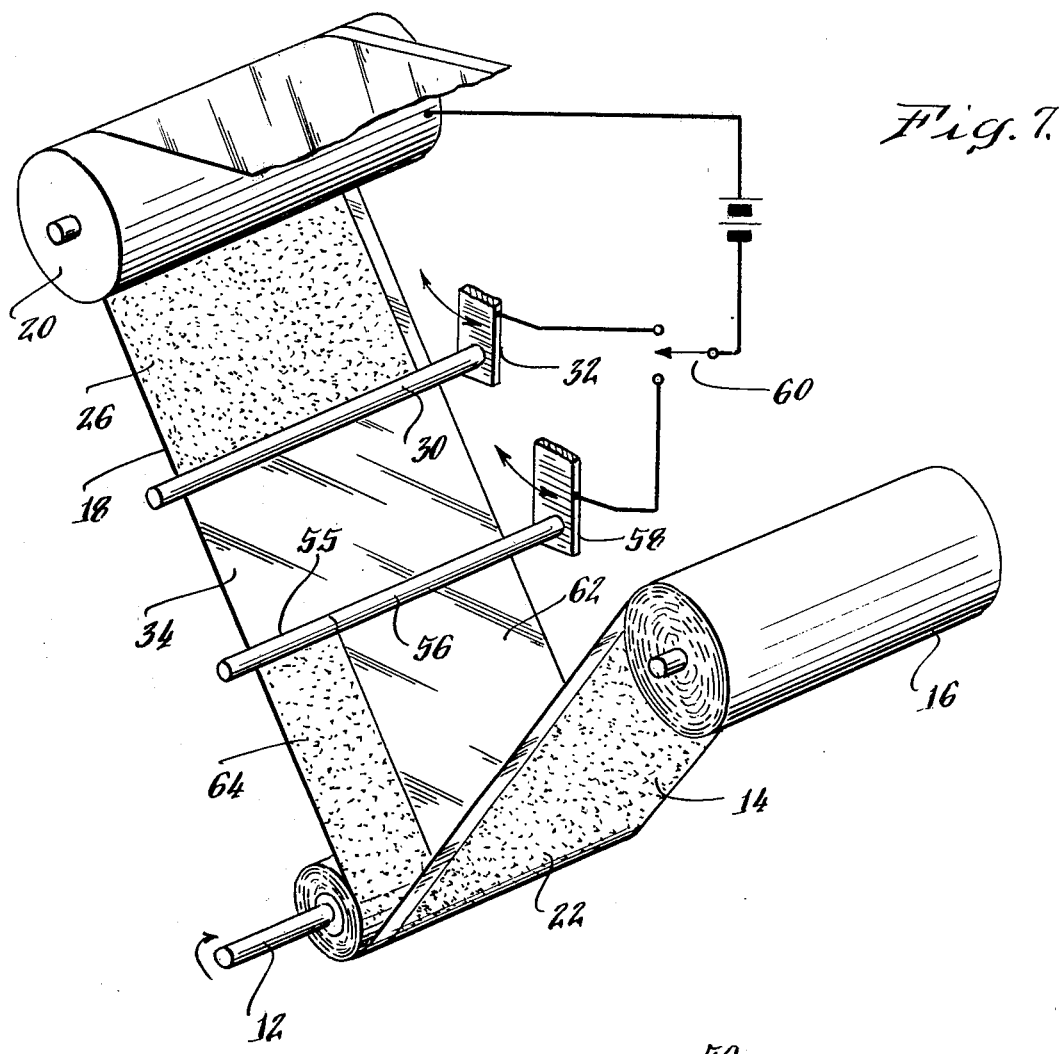
FIG. 7 is a perspective view illustrating the winding of a multiple element capacitor in which in one step only a portion of the width of the metallized side is removed.

FIG. 7 illustrates another technique for producing a low value capacitance combined with a larger value while still using the same width of dielectric materials which would normally be used for the larger value capacitor. As seen in FIG. 7 a combination metal and plastic bar 56 is provided mounted on a swinging arm 58 for selectively engaging the metallized layer 26 of the metallized dielectric film 18. A switch 60 is provided for switching between the metal electrode 30 and the plastic-metal electrode 56. When the combination metal and plastic bar 56 is brought into engagement with the metallized layer 26 on the metallized dielectric film 18, the plastic portion 55 of the bar 56 leaves a metallized layer 64 which extends only partially across the width of the metallized film 18. The metal portion of the bar 56 on coming into contact with the metallized layer 26 vaporizes that layer leaving a partially demetallized region 62 along the right side of the film 18. It will be noted that the metallized portion 64 extends to the left edge which is coated for attaching an electrical connection thereto. In order to wind a capacitor of a certain value, a larger number of turns will be required using partial demetallization than would be the case if turns of complete metal layers are used. This, in effect, creates a plate of a small capacitor having a larger number of turns on the left edge to which an electrical connection can be made. After the partial demetallization is created by the bar 56, it is removed and the bar 30 is actuated to produce the normal demetallized zone 34 which region receives the insulating sheet 36 (not shown in FIG. 7) in order to provide a barrier around the small capacitor plate formed by the metallized layer 64 on the film 18. With a larger number of turns being wrapped inside the barrier, it is much easier to make an electrical connection thereto. At the same time, a larger value capacitor can then be wound on top of the smaller one using the conventional widths of dielectric films 14 and 18.

The present invention has thus provided a convenient, efficient, and high production method for making multiple section capacitors using thin films. Even though certain elements of the capacitor are relatively small, for example, 0.05 microfarad, connections can be readily made thereto using several convenient approaches as described hereinbefore.

Since other changes and modifications varied to fit particular operating requirements and environments will be apparent to those skilled in the art, the invention is not considered limited to the examples chosen for purposes of illustration, and covers all changes and modifications which do not constitute a departure from the true spirit and scope of this invention.

What is claimed is:

1. The method of making multiple element, cylindrical, metallized film capacitors from first and second dielectric films which are metallized on one side thereof and which are wound in cylindrical form with the non-metallized side of one film being in contact with the metallized side of the other film comprising the steps of:
    providing a non-metallized area on a portion of the metallized side of said first dielectric film,
    inserting a metal strip of predetermined length over the non-metallized area of said first film, said metal strip forming one plate of a small capacitor of the multiple element capacitor being wound,
    inserting an insulating strip of predetermined length between said first and second dielectric films,
    isolating said one plate of said multiple element capacitor from the remaining elements thereof by winding at least one turn of said insulating strip around said metal strip,
    completing the winding of said first and second films, and
    connecting a leadwire to said metal strip which constitutes a connection to the small capacitor formed by said metal strip in said multiple element capacitor.

2. The method set forth in claim 1 in which said metal strip has a metal tab extending therefrom and the step of connecting a leadwire is made to said metal tab on said metal strip.

3. The method set forth in claims 1 or 2 in which said metal strip is preloaded on said insulating strip and is inserted as a single item in said winding process, and
    selectively cutting said preloaded insulating strip to provide the desired capacitor section to said wound capacitor.

4. The method set forth in claim 1 having two spaced metal strips with tabs being consecutively fed to said winding followed by said insulating strip forming plates on two small capacitors which may be serially interconnected to provide yet a smaller value capacitor.

5. In a multiple element, cylindrical capacitor wound from first and second dielectric films selectively metallized on one side and having at least one unmetallized section on one of said films selectively forming first and second layers of metal separated by dielectric film, the invention comprising:

a metal insert having a metal tab extending therefrom, said metal insert interleaved between said first and second dielectric films in contact with said unmetallized section of one of said films, said metal tab extending from an end portion of said capacitor and adapted to receive an electrical connection thereto, an insulating insert interleaved between said first and second films between said metal insert on one of said metallized layers surrounding said metal insert to isolate said metal insert from said metallized layer whereby said metal insert forms a separate plate in said multiple element capacitor.

6. The method of making multiple element, cylindrical, metallized film capacitors from first and second dielectric films which are metallized on one side thereof, said metallized side of said first and second films only being exposed at opposite edges thereof, and which are wound in cylindrical form with the non-metallized side of one film being in contact with the metallized side of the other film and the metallized edges of said first and second films being exposed on opposite ends of said cylindrical capacitor comprising the steps of:

removing a portion of the metallized side of said first film inward from the edge opposite the exposed metallized edge of said first film thereby forming a partial metallized region which extends over only part of the width of the metallized side of said first film, removing the metallized region across the width of said metallized side of said first film for a predetermined length of said first film following said partial metallized region thereby forming a totally demetallized region on said first film, winding said first and second films to form capacitor elements therebetween, inserting and winding an insulated strip between said first and second films located in said totally demetallized region of said first film, said insulated strip surrounding and forming a barrier around said partial metallized region of said first film, completing the windings of said first and second films, metal coating the end of said first film within said barrier containing said partial metallized region of said first film, connecting a leadwire to said metal coating within said barrier for making an electrical connection to a small capacitor element formed within said barrier.

7. The method of making multiple element, cylindrical, metallized film capacitors from first and second dielectric films which are metallized on one side thereof and which are wound in cylindrical form with the non-metallized side of one film being in contact with the metallized side of the other film comprising the steps of:

providing a non-metallized area on a portion of the metallized side of said first dielectric film, inserting an insulating strip of predetermined length followed by a metal strip of predetermined length forming a single sheet between said first and second dielectric films, said metal strip overlaying said non-metallized area of said first film and forming one plate of a small capacitor of the multiple element capacitor being wound, isolating said one plate of the multiple element capacitor from the remaining elements thereof by winding at least one turn of said insulating strip around said metal strip, completing the winding of said first and second films, and connecting a leadwire to said metal strip which constitutes a connection to the small capacitor formed by said metal strip in said multiple element capacitor.

8. The method set forth in claim 7 in which said metal strip has a metal tab extending therefrom and the step of connecting a leadwire is made to said metal tab on said metal strip.

* * * * *